US007637977B2

(12) United States Patent
Lucidera

(10) Patent No.: US 7,637,977 B2
(45) Date of Patent: Dec. 29, 2009

(54) INTEGRATED UNIT FOR AIR TREATMENT IN PNEUMATIC SYSTEMS

(75) Inventor: Marco Lucidera, Rodengo Saiano BS (IT)

(73) Assignee: Metal Work S.p.A. (IT)

(*) Notice: Subject to any disclaimer, the term of this patent is extended or adjusted under 35 U.S.C. 154(b) by 1110 days.

(21) Appl. No.: 11/013,190

(22) Filed: Dec. 15, 2004

(65) Prior Publication Data

US 2009/0064865 A1 Mar. 12, 2009

(30) Foreign Application Priority Data

Dec. 22, 2003 (IT) .............................. MI03A2563

(51) Int. Cl.
*B01D 46/00* (2006.01)
*F15B 21/00* (2006.01)

(52) U.S. Cl. ..................... 55/418; 55/423; 55/DIG. 17; 96/409; 91/29; 137/110; 137/884

(58) Field of Classification Search .................. 55/418, 55/420, DIG. 17, DIG. 25, 423, 466; 137/544, 137/884, 110; 91/29; 96/408, 409
See application file for complete search history.

(56) References Cited

U.S. PATENT DOCUMENTS

| | | | | |
|---|---|---|---|---|
| 2,017,350 | A | 10/1935 | Morgan | |
| 3,572,469 | A | 3/1971 | Miller et al | |
| 3,606,936 | A | 9/1971 | Obergefell et al. | |
| 3,703,069 | A * | 11/1972 | Wheeler | 55/337 |
| 3,767,053 | A | 10/1973 | Bavin | |
| 3,945,465 | A | 3/1976 | Horst et al. | |
| 4,192,346 | A * | 3/1980 | Iizumi | 137/601.13 |
| 4,316,801 | A | 2/1982 | Cooper | |
| 4,402,254 | A * | 9/1983 | Petrimaux et al. | 91/29 |
| 4,487,618 | A | 12/1984 | Mann | |
| 4,915,126 | A * | 4/1990 | Gyllinder | 137/495 |
| 5,052,433 | A * | 10/1991 | Levenez | 137/513.3 |
| 5,067,519 | A * | 11/1991 | Russell et al. | 137/596.14 |
| 5,337,788 | A * | 8/1994 | Nelson | 137/627.5 |
| 5,381,828 | A * | 1/1995 | Kimura et al. | 137/596 |
| 5,669,422 | A | 9/1997 | Tarusawa | |
| 6,006,603 | A * | 12/1999 | Molnar et al. | 73/168 |
| 6,169,338 | B1 | 1/2001 | Stoll et al. | |
| 6,332,917 | B1 * | 12/2001 | Schollkopf | 96/397 |
| 6,354,329 | B1 | 3/2002 | Kuther et al. | |
| 6,868,868 | B2 * | 3/2005 | Okitsu | 137/884 |
| 7,210,393 | B2 * | 5/2007 | Lucidera | 91/29 |
| 2003/0136452 | A1 | 7/2003 | Okitsu | |
| 2007/0125050 | A1 * | 6/2007 | Nakajima et al. | 55/418 |

FOREIGN PATENT DOCUMENTS

| | | | |
|---|---|---|---|
| DE | 3909402 | A1 | 9/1990 |
| EP | 1079120 | A2 | 2/2001 |
| GB | 2384327 | | 7/2003 |

* cited by examiner

*Primary Examiner*—Frank M Lawrence
*Assistant Examiner*—Robert A Clemente
(74) *Attorney, Agent, or Firm*—Shlesinger & Fitzsimmons

(57) ABSTRACT

An integrated unit for air treatment in pneumatic systems comprises a box-shaped body provided with an inlet for the air to be treated and at least one outlet for the treated air and holds devices for treatment and regulation of the air flow between the inlet and outlet. The devices consist of at least one filter device, one pressure regulator and one progressive-starting device.

22 Claims, 4 Drawing Sheets

INTEGRATED UNIT FOR AIR TREATMENT IN PNEUMATIC SYSTEMS

BACKGROUND OF THE INVENTION

1. Field of the Invention

The present invention relates to an integrated unit performing a plurality of functions related to air treatment in pneumatic systems.

2. State of the Prior Art

Practically all pneumatic systems using compressed air for actuation functions of every type start with a unit for treatment of the compressed air. In fact, the air before being admitted into the distributors and actuators is required to be regulated and filtered. Therefore, these units are applied to all working machines, such as assembling machines, machine tools, packaging machines, etc.; in the compressed-air distribution systems, in the car field, in particular in equipped lorries, in the industry field, etc.

All known units consist of individual elements, each having a specific function, that are then assembled in series with each other. The most traditional combination of elements used in automation may comprise a manual on-off valve at the inlet, a filter, a pressure regulator, an electric on-off valve, a pressure switch, several intakes, etc.

The elements can be someway of the modular type so as to have attachments and sizes compatible with each other in the same series, but in any case they are always elements that must be assembled one after the other.

There are many limits and defects in the units made with known elements. It is to be mentioned the big sizes, in particular with a high extension in the formation direction of the series; the very bad ergonomics due to the fact that the functions of interest of the user or the maintenance man are distributed in an incoherent manner on the unit, some on the upper side (the pressure regulating hand grips, for example), some on the front (manometer, etc.), some on the lower side (filter cup), so that there are not only positioning difficulties but also a poor understanding of the functions performed by each element and of the point which must be acted upon for regulations; the difficulties for servicing interventions, such as replacement of the filter cartridge; the very bad overall aesthetic appearance that is no longer suitable for the modern machines for which the units are designed.

In addition, some functional problems are still unresolved, so that the reliability of the system as a whole is impaired due to leakages, jamming, etc.

For example, in known filter modules or elements the servicing interventions, such as replacement of the filter cartridge, are difficult and often uncomfortable, above all when the unit is positioned in regions of the machine utilizing it that are hardly accessible. In particular, in order to receive the condensate at the filter base, the cartridge is always disposed vertically in a cup under the air inlet, with the air flow that is radially directed from the cartridge outside to the inside. Such an arrangement creates problems in terms of vertical bulkiness that can be hardly resolved, so that uncomfortable operations are required even if the filter cup is only to be unscrewed.

In addition, the automatic systems for condensate discharge are subjected to jamming in the presence of solid particles suspended in the air and therefore they are often refused by the user.

It is a general aim of the present invention to obviate the above mentioned drawbacks by providing an innovative integrated unit enabling supply of the different facilities that are necessary at the inlet of pneumatic systems and, among other things, possessing features of small bulkiness, high reliability, practical and quick use and ready maintenance.

It is a further aim of the present invention to provide said unit with a filtering device equipped with an efficient and easily accessible filter, above all for the operations concerning maintenance and replacement of the cartridge and that, if also equipped with a device for condensate discharge, does not suffer for jamming due to the presence of solid particles entrained into the device by the air flow.

A still further aim of the present invention is to provide the unit with a regulation device for progressive starting that is of reduced bulkiness and is capable of offering a satisfactory progressive starting irrespective of the conditions of the circuit downstream thereof.

SUMMARY OF THE INVENTION

In view of the above aims, in accordance with the invention, an integrated unit for air treatment in pneumatic systems has been devised, which comprises a box-shaped body provided with an inlet for the air to be treated and with at least one outlet for the treated air and containing devices for treatment and regulation of the air flow between the inlet and outlet, said devices comprising at least one filter device, one pressure regulator and one progressive-starting device.

BRIEF DESCRIPTION OF THE DRAWINGS

For better explaining the innovative principles of the present invention and the advantages it offers over the known art, a possible embodiment applying said principles will be described hereinafter by way of example, with the aid of the accompanying drawings. In the drawings.

DETAILED DESCRIPTION OF THE INVENTION

Figure 1:
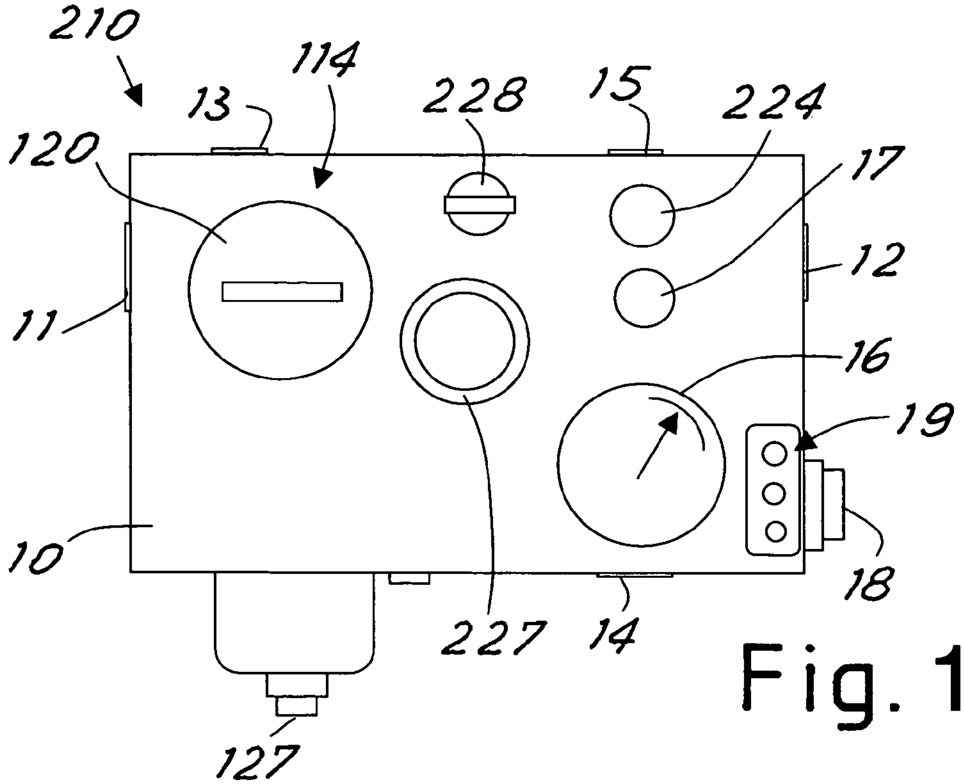
FIG. 1 is a diagrammatic front view of a unit in accordance with the invention.

With reference to the drawings, shown in FIG. 1 is an integrated unit generally denoted at 210, implemented in accordance with the principles of the invention. Unit 210 has a generally parallelepiped or box-shaped conformation with a body 10 on the external surface of which connectors, commands, indicators, etc. appear. In particular, a main inlet connector 11 and an opposite main outlet connector 12 are present. Advantageously, also an auxiliary outlet 13 which is filtered but not regulated and two auxiliary outlets 14, 15 in parallel to the main outlet 12 but with a connector of different diameter (¼", for example) can be present. All connectors are disposed on side faces.

The indicators and commands are disposed on the front panel. As clarified in the following, they comprise, among other things, a regulator 224 for regulation of the progressive-starting function and a manual shutoff and air-discharge valve 228. Advantageously, there may be also the presence of a pilot pressure regulator 227, an outlet pressure switch 17, a manometer 16 and LED signallers visually indicating the activation state of the pressure switch and the state of a possible inner solenoid valve (denoted at 229 in FIG. 4). The connections of the manometer and pressure switch at the exit of the device are well visible in the section in FIG. 5 as well.

As further described in the following, unit 210 also comprises a filter device 114 whose plug 120 for access to the cartridge is disposed with a horizontal axis and appears on the front panel as well, and a condensate discharging device 115 with a lower outlet 127 for the water and projecting from the lower side of the unit.

Also provided may be an electric side connector 18 reproducing the electric signals of the pressure switch and LED indicators and said connector 18 is powered and receives the activation signal from the solenoid valve.

Figure 2:
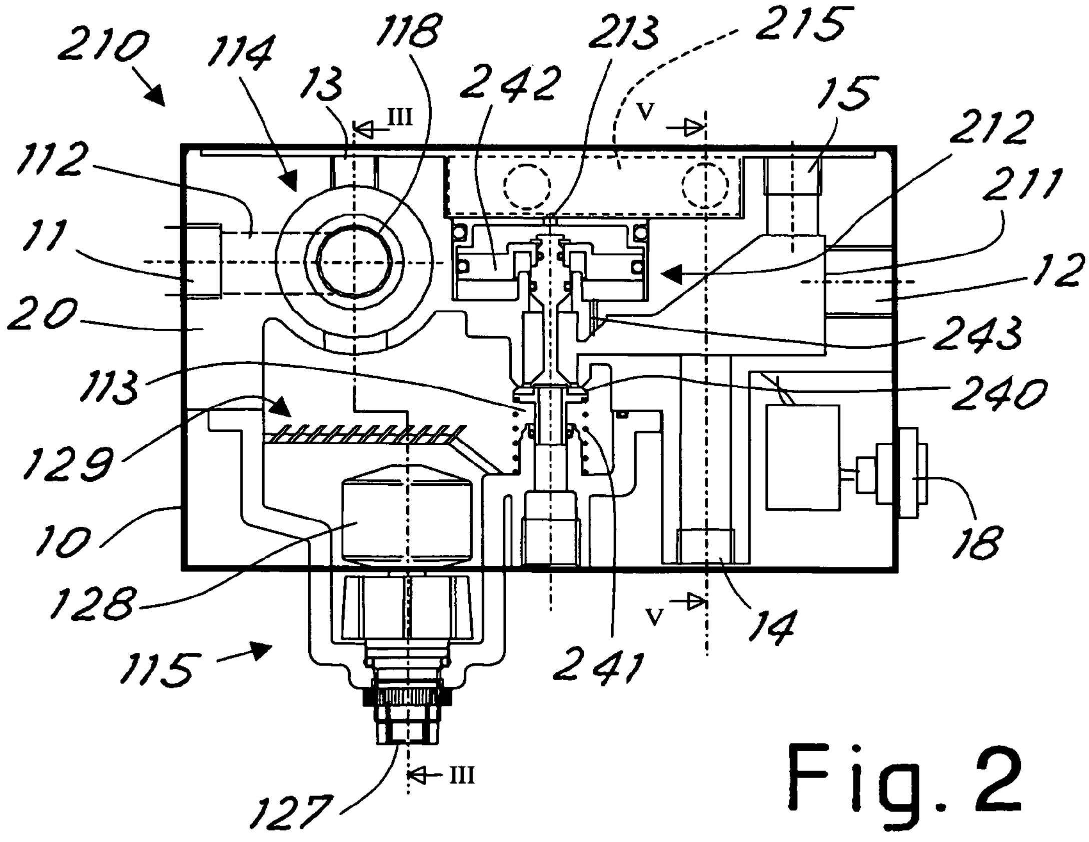
FIG. 2 is a diagrammatic view partly in section of part of the inside of the unit seen in FIG. 1.

Shown in FIG. 2 is part of the whole unit. In particular, clearly shown is the main inlet connector 11, the device portion 110 concerning filtering and condensate discharge, with the filter unit 114 and the condensate collection and discharge assembly 115, a piloted valve 212 for pressure regulation, a piloting unit with progressive starting 215.

Figure 3:
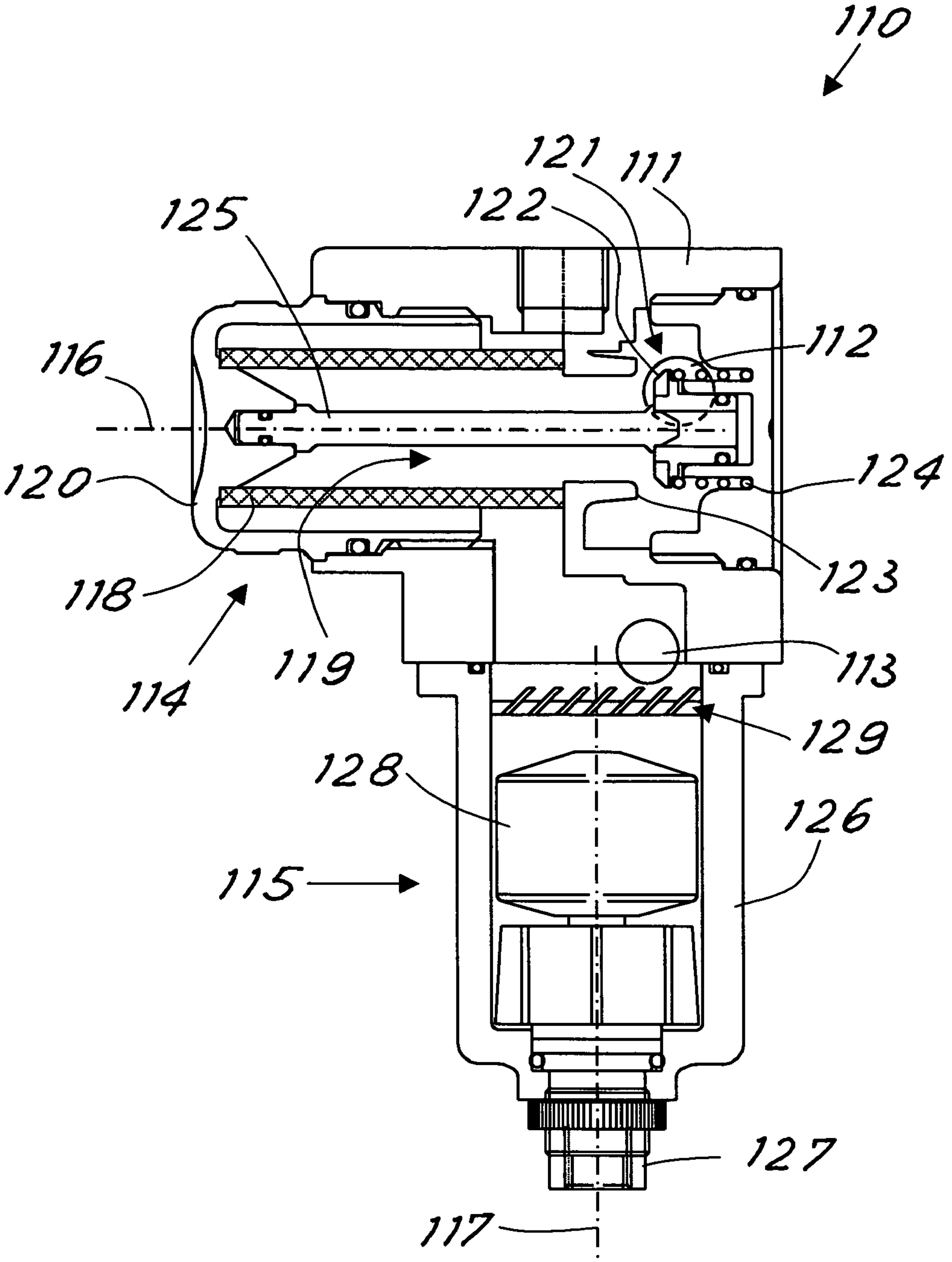
FIG. 3 is a diagrammatic view of the unit taken along line III-III in FIG. 2.

Diagrammatically shown in FIG. 3 is a section taken along line III-III in FIG. 2 of the portion 110 of unit 210 carrying out air filtering and condensate discharge, in accordance with a preferred solution of the invention.

With reference to FIG. 3, the filter and condensate discharge region comprises a body 111 (advantageously of one piece with the body of the remainder of the unit) provided with an inlet 112 for the air to be filtered coming from the main inlet connector 11, and an outlet 113 for the filtered air which is directed to the remainder of the unit and towards the main outlet connector 12. Housed in body 111 is the filter unit 114 and the condensate collection and discharge assembly 115.

The filter unit 114 is advantageously extended along a horizontal axis 116 while the condensate assembly 115 is disposed under the filter unit and is extended along a vertical axis 117. The condensate assembly is disposed downstream of the filter unit and the air flow radially passes through the filter from the inside to the outside.

In particular, the filter unit is provided with a suitable cylindrical filtering cartridge 118, received in a suitable seat 119 sealingly closed by the threaded plug 120, also of horizontal axis 116.

Advantageously, the air inlet 112 communicates with the inside of cartridge 118 through an on-off valve 121 the closure member 122 of which is pushed and closed against an abutment 123 by the action of a spring 124. Axially present internally of the plug 120 is a rod 125 that, when the plug 120 is correctly screwed down in place, keeps the valve open against the action of spring 124.

The condensate assembly 115 comprises a cup 126 for collection of the condensate entrained through the filter. The cup has a lower exhaust outlet 127 that can be operated either manually (with a screw threaded plug or a valve, for example) or advantageously in an automatic manner by a known float valve 128 opening when the liquid level in the cup exceeds a predetermined threshold.

Present on the cup 126 top is a system consisting of inclined lamellae 129 such disposed that they are licked by the air flow directed towards the outlet 113 so as to separate the condensate from the flow itself and cause dripping of the condensate into the underlying cup.

The horizontal arrangement of the filter with front extraction makes the device both compact and of easy placement and quick maintenance. In addition, the air flow passing through the filter cartridge from the inside to the outside causes the intercepted dirt to remain internally of the cartridge when the latter is removed from its seat, which will facilitate replacement of the cartridge and make it quicker. Separation of the condensate after filtering also prevents particles of dirt from reaching the condensate assembly and stopping or clogging the exhaust outlet. This ensures a high reliability of the possible advantageous self-discharge device.

Automatic closure of the inlet air flow when the filter plug is unscrewed avoids accidental air escape into the surrounding atmosphere and makes filter replacement more comfortable and quicker. Since separated flow cut-off cocks are not required, the device is cheaper and less bulky.

Turning back to FIG. 2, the outlet 113 after discharge of the condensate directly leads to a regulation valve 212 provided with a closure member 240 that, urged by a spring 241, closes passage to the outlet 12. The closure member 240 is operated for opening by a control piston 242 which is acted upon, on the side towards the closure member, by the outlet pressure (through a passage 243) and, on the side opposite to the closure member, by a control pressure (through a passage 213). Thus a pressure regulating valve 212 of the differential type is obtained, i.e. a regulation member that is movable by means of the opposite thrusts produced by the pressure coming out of the regulator itself and by the pressure at the piloting inlet 213.

The piloting inlet is controlled by a piloting module or unit, generally denoted at 215, to perform, among other things, the function of progressive starting.

Figure 4:
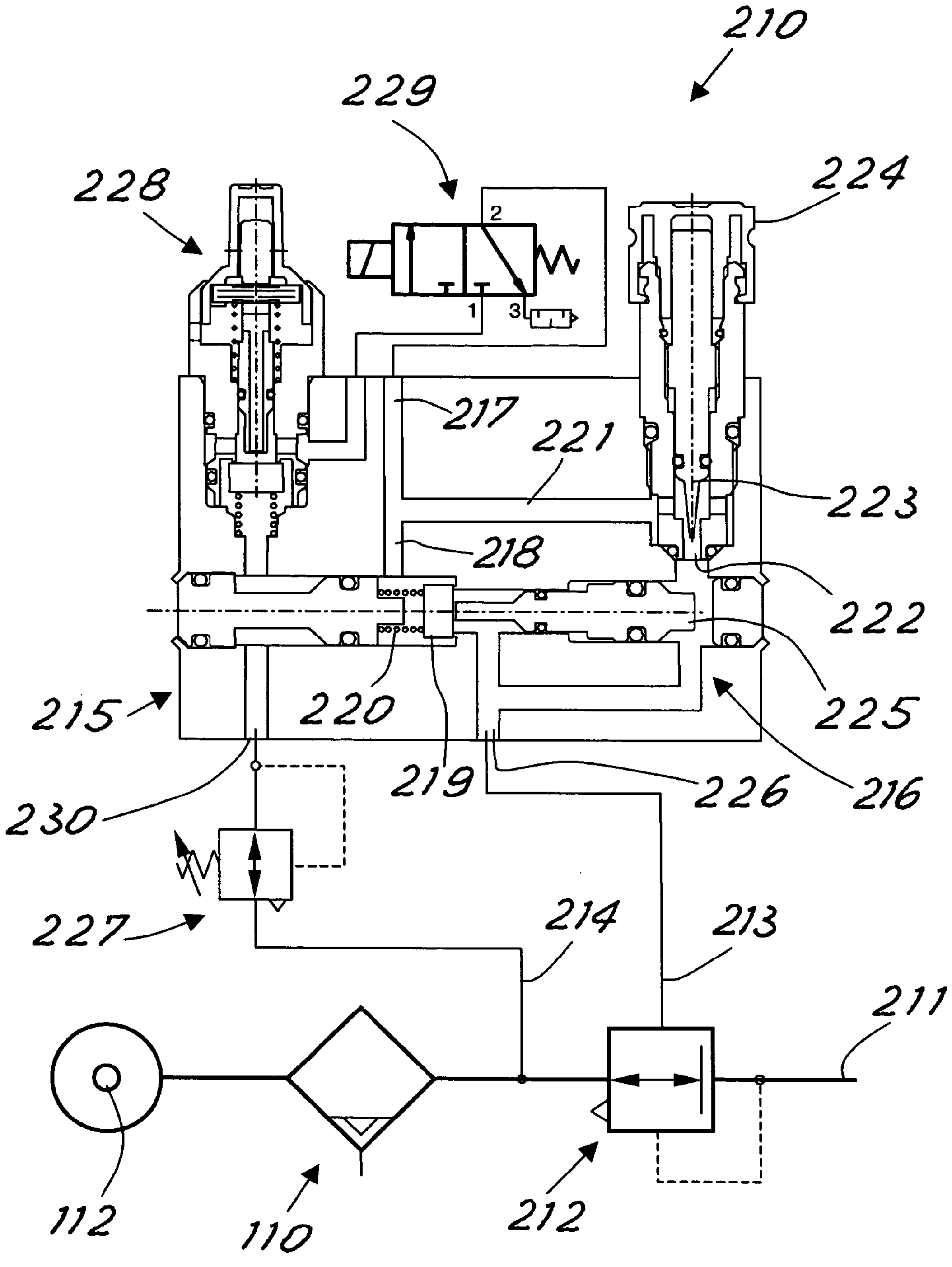
FIG. 4 is a diagrammatic view in section of a detail of the unit where also part of the block diagram of the unit circuit is represented.
Figure 5:
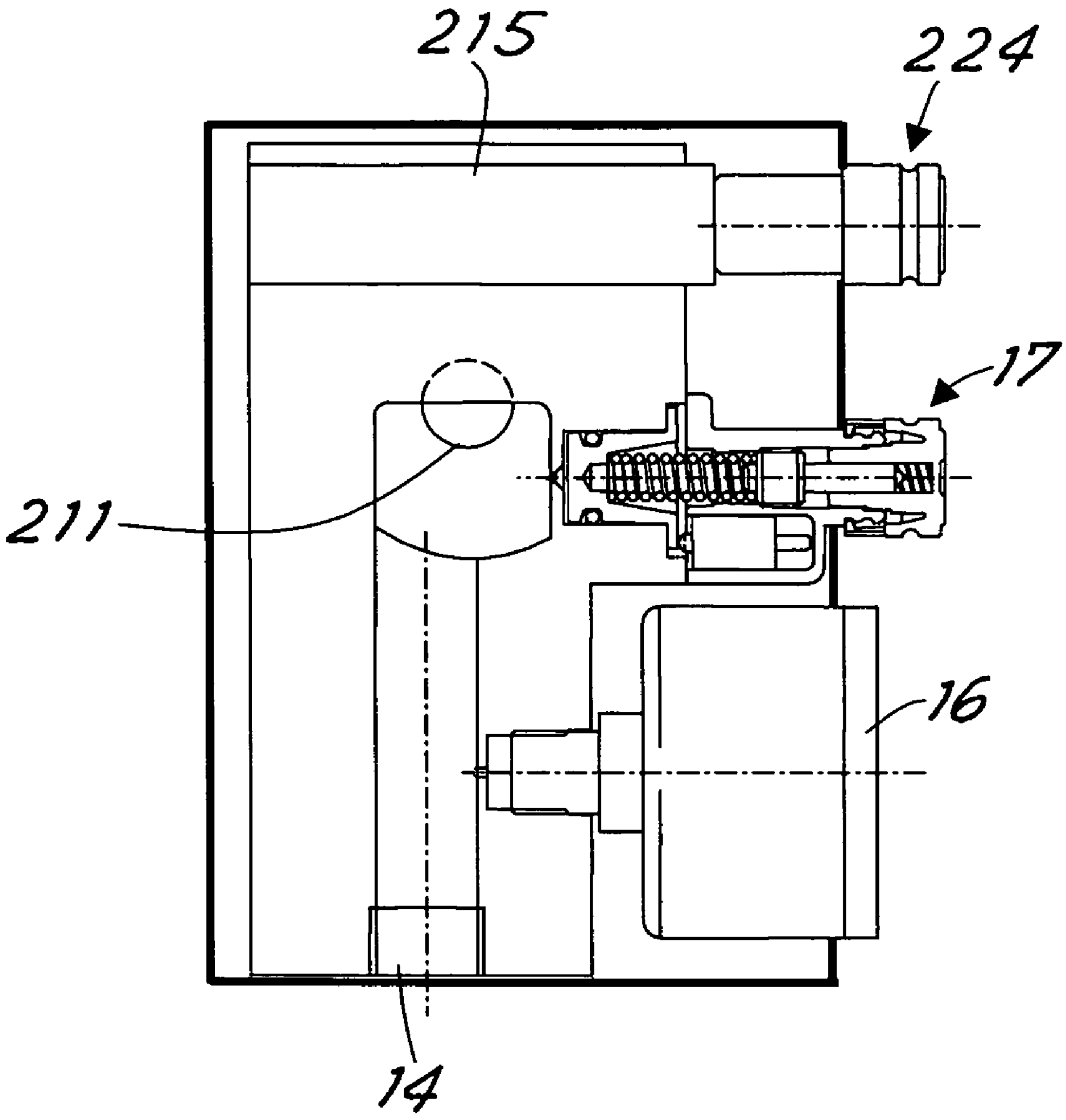
FIG. 5 is a diagrammatic view of the unit taken along line V-V in FIG. 2.

An advantageous embodiment of the piloting unit 215 is shown in FIG. 4 (in an extended view for better understanding). This unit 215 comprises an inlet 230 that will be connected upstream of valve 212 (through a passage 214, not shown in FIG. 2), and an outlet 211 directed to the outlet connector 12.

As clearly shown in the circuit diagram drawn under module 215, between the inlet and outlet there is the presence of the pressure regulator 212 being controlled by the piloting inlet 213.

Connected upstream of regulator 212 is the inlet of a secondary circuit 214 leading to a piloting unit 215 supplying the piloting command 213 to valve 212.

The piloting unit comprises a progressive starting device 216 fed from the inlet 214 and sending air from the outlet 226 to the piloting command 213.

In particular, device 216 comprises an inlet duct 217 connected to the inlet 214, possibly through further control members to be described in the following. Duct 217 is divided into a main branch 218, connected with the outlet 226 through an on-off valve or closure member 219 pushed for closure by a spring 220, and a secondary branch 221 reaching the outlet 226 through a throttled passage 222. Throttling 222 can be advantageously obtained in an adjustable manner by means of a pin 223 axially movable through an adjusting hand grip 224.

A distributor or slide valve 225 exerts pressure on the closure member 219 in the direction of the opening thereof, against the action of spring 220, due to the pressure to which it is subjected that is created in the outlet duct 226. In this manner, the flow rate established by the pin produces a gradual pressure increase in the outlet duct until the thrust present on the side downstream of the closure member 219 overcomes the thrust on the upstream side and the closure member opens the main duct 218 to the outlet. It is apparent that pressure variation on the outlet 226 is used to consequently control operation of valve 212 that will thus produce a corresponding pressure variation in the outlet line 211. Obviously the variation on the outlet 211 takes place irrespective of what is connected therewith.

Thus a perfect progressive starting is obtained under any load condition of the line. Reaching of the condition of full operation of the main circuit is also ensured irrespective of the presence of possible small pressure losses on the main circuit itself.

In the advantageous embodiment described, the true progressive starter acts on piloting of a valve instead of being directly placed on the main line, which on the contrary happens in the known art.

Such a structure also offers other advantages. The progressive starter 216 must be sized for the (very reduced) pilot flow rate necessary for regulator 212 and not for the much bigger flow rate of the main line 211. This enables a progressive starting unit to be made which is of much more reduced bulkiness than in the solutions of the known art. The intrinsic sturdiness of the unit is also favored.

The piloting circuit of valve 212 with which the progressive starter is connected can also advantageously be a pilot circuit for pressure regulation on the main line. In fact, if along line 214 a known pilot pressure regulator 227 is placed, pressure stabilization on the outlet line 211 occurs during normal operation after the progressive starting. In addition, also provided in series with the pilot regulator can be a manual valve 228 and/or an electric valve 229, of the type 3/2. Advantageously, as shown in FIG. 4, valve 228 can be inserted in the body of the progressive starter. Valves 228, 229 enable opening and closure of valve 212 to be carried out in a controlled manner. Thus an efficient piloted regulator of reduced bulkiness and high sturdiness is obtained.

At this point it is apparent that the intended purposes have been achieved by providing an integrated unit having many functions while being of reduced sizes, said unit also offering high efficiency, reliability and sturdiness. It is clear that an integrated unit manufactured in accordance with the invention can be easily positioned in reduced spaces while always maintaining high accessibility and ease of use and maintenance. It is also apparent that the manufacturing costs can be greatly reduced as compared with those of the known art according to which separated elements to be assembled are provided. In particular, use of a monobloc body between the inlet and outlet of the unit and enclosing most of the facilities required further reduces costs and bulkiness and prevents many possibilities of leakage. In the advantageous embodiment shown the whole unit is substantially formed of two bodies, the main one 20, with the filter, the controlled valve 212 and all the ducts between the inlet and outlets, and a secondary body implementing the control module 215. Due to the front arrangement of the displays and commands, the device can be easily mounted on a panel.

Obviously, the above description of an embodiment applying the innovative principles of the present invention is given by way of example only and therefore must not be considered as a limitation of the scope of the patent rights herein claimed.

What is claimed is:

1. An integrated unit for air treatment in pneumatic systems comprising a box-shaped body provided with an inlet for the air to be treated and at least one outlet for the treated air and holding devices for air flow treatment and regulation between in inlet and outlet, said devices comprising at least one filter device, a pressure-regulating value and a progressive starting device, characterized in that comprised in said box-shaped body is a main body holding at least the ducts between the inlet and outlet, the filter device and said pressure-regulating valve, and an auxiliary body that in turn holds a pilot device of the pressure-regulating valve to implement said progressive starting device that is assembled with the main body.

2. A unit as claimed in claim 1, characterized in that it is provided with commands for the treatment and regulation devices, which commands are disposed on the front face of the box-shaped body, and in that the connectors for said inlet and the at least one outlet are disposed on side faces of the box-shaped body.

3. A unit as claimed in claim 1, characterized in that appearing on the front face of the box-shaped body is a pressure switch and a manometer that are connected to said outlet.

4. A unit as claimed in claim 1, characterized in that the pressure-regulating valve is disposed downstream of the filter device and comprises a closure member which, urged by a spring, closes the passage towards the outlet, the closure member being driven to the open position by a control piston which is acted upon, on the side towards the closure member, by the pressure on the outlet and, on the side opposite to the closure member, by a control pressure reaching said pilot device.

5. A unit as claimed in claim 1, characterized in that the filter device comprises a filter cartridge extended along a horizontal axis, and is provided wit a plug that can be opened for removal of the cartridge, said plug appearing on a front face of the box-shaped body.

6. A unit as claimed in claim 5, characterized in that the air inlet communicates with the inside of the filtering cartridge in such a manner that the air flow passes through said cartridge from the inside to the outside.

7. A unit as claimed in claim 6, characterized in that the air inlet communicates with the inside of the cartridge through an on-off valve that closes on opening to the outside of the seat for receiving the filtering cartridge, for removal of said cartridge.

8. A unit as claimed in claim 7, characterized in that the filter device comprises a filter cartridge extended along a horizontal axis, and is provided with a plug that can be opened for removal of the cartridge, said plug appearing on the front face of the box-shaped body and in that the on-off valve comprises a closure member pushed to the closed position by a spring, and in that a rod axially projects from the inside of said plug, which rod after axially passing through the cartridge, pushes the closure member to the open position when the plug is in the position for sealingly closing the seat.

9. A unit as claimed in claim 1, characterized in that said treatment and regulation devices further comprise a device for collection and discharge of the condensate, which device appears on a lower side face of the box-shaped body.

10. A unit as claimed in claim 9, characterized in that the condensate collection and discharge device is disposed under and downstream of the filter device.

11. A unit as claimed in claim 9, characterized in that the condensate assembly comprises a cup for collection of the condensate entrained through the filter and is provided with a lower exhaust outlet.

12. A unit as claimed in claim 11, characterized in that the exhaust outlet is equipped with an automatic float valve opening when the liquid level in the cup exceeds a preestablished threshold.

13. A unit as claimed in claim 11, characterized in that on the cup top there is the pressure of an inclined-lamellae system such disposed as to be licked by the air flow directed towards the outlet so as to separate the condensate from the flow itself and cause dripping of said condensate into the underlying cup.

14. A unit as claimed in claim 1, characterized in that the progressive starting device has the inlet connected upstream of said pressure-regulating valve and the outlet connected with a pilot inlet of said regulating valve.

15. A unit as claimed in claim 14, characterized in that the inlet duct of the progressive starting device is divided into a main branch connected with the outlet through a closure member pushed to the closed position by a spring, and a secondary branch reaching the outlet through a throttled passage; a control element being provided which acts on the closure member in the opening direction of the latter, against the action of the spring, due to the pressure, to which it is submitted, that is created in the outlet duct, which means that opening of the closure member is caused when a preestablished pressure is reached in the outlet duct.

16. A unit as claimed in claim 15, characterized in that the throttled passage is obtained by means of a pin axially movable by means of an adjusting hand grip.

17. A unit as claimed in claim 14, characterized in that the inlet of the progressive starting device is connected upstream of the regulating valve through a pilot pressure regulator.

18. A unit as claimed in claim 14, characterized in that the inlet of the progressive starting device is connected upstream of the regulating valve trough a manually controlled on-off valve.

19. A unit as claimed in claim 14, characterized in that the inlet of the progressive starting device is connected upstream of the regulating valve through an electrically controlled on-off valve.

20. A unit as claimed in claim 18, characterized in that the command of the manually controlled on-off valve appears on the front face of the box-shaped body.

21. A unit as claimed in claim 1, characterized in that it comprises an electric socket for signal exchange and powering between the inner devices and the external enviromnent.

22. A unit as claimed in claim 1, characterized in that it comprises pilot lights for signaling the state of the inner devices, such as electric valves and pressure switches.

* * * * *